United States Patent [19]

Delmer et al.

[11] Patent Number: 4,548,360
[45] Date of Patent: Oct. 22, 1985

[54] MULTICHAMBER DRIP IRRIGATION HOSE

[75] Inventors: Daniel W. C. Delmer, Baywood Park; William A. Delmer, Huntington Beach, both of Calif.

[73] Assignee: William W. C. Delmer, Huntington Beach, Calif.

[21] Appl. No.: 613,741

[22] Filed: May 22, 1984

Related U.S. Application Data

[63] Continuation of Ser. No. 346,592, Feb. 8, 1982, abandoned.

[51] Int. Cl.[4] ............................................. B05B 15/00
[52] U.S. Cl. ............................................. 239/542; 138/42
[58] Field of Search ............... 239/450, 542, 547, 145; 138/42, 43, 103

[56] References Cited

U.S. PATENT DOCUMENTS

| | | | |
|---|---|---|---|
| 1,104,714 | 7/1914 | Sonnier | 239/450 |
| 1,484,575 | 2/1924 | Shulin | 239/542 |
| 2,749,180 | 6/1956 | Andrews | 239/450 |
| 2,757,965 | 8/1956 | Andrews | 239/450 |
| 3,736,755 | 6/1973 | Hammond et al. | 239/542 |
| 3,903,929 | 9/1975 | Mock | 239/145 X |
| 4,009,832 | 3/1977 | Tiedt | 239/542 |
| 4,047,995 | 9/1977 | Leal-Diaz | 239/542 |
| 4,053,109 | 10/1977 | Gilead | 239/542 |
| 4,095,750 | 6/1978 | Gilead | 239/542 |
| 4,196,853 | 4/1980 | Delmer | 239/450 |
| 4,235,380 | 11/1980 | Delmer | 239/542 |
| 4,247,051 | 1/1981 | Allport | 239/542 |
| 4,346,737 | 8/1982 | Miller | 138/42 |
| 4,474,330 | 10/1984 | Langa | 239/450 |

*Primary Examiner*—Andres Kashnikow
*Assistant Examiner*—David P. Davidson
*Attorney, Agent, or Firm*—Harris, Kern, Wallen & Tinsley

[57] ABSTRACT

A multichamber drip irrigation hose for distributing water and the like. A hose having a larger primary tube and a smaller secondary tube joined at a common wall, with passages in the common wall for flow from the primary tube to the secondary tube, and with passages in the secondary tube for flow from the secondary tube to the exterior. The tubes of the hose are formed from a strip of sheet material having opposite edges with one or both edges folded on itself to form a thicker edge, and with the strip folded and bonded to both thicker edges or one thicker edge and to the strip along a line spaced from the thicker edge, to form the primary and secondary tubes. Various fold configurations are possible.

21 Claims, 8 Drawing Figures

MULTICHAMBER DRIP IRRIGATION HOSE

This case is a continuation of application Ser. No. 346,592 filed 2/8/82, now abandoned.

BACKGROUND OF THE INVENTION

The present invention relates to hose for what is now generally referred to as drip type irrigation. In drip type irrigation, hose is positioned in spaced parallel rows across the growing area, either laying on the ground, buried in the ground, or suspended above the ground. Outlet openings are spaced along the lengths of hose. The purpose of the hose is to provide a continuous low rate of flow of water or water with fertilizer and/or pesticide, and it is desirable to have the hose operate for a long period of time without clogging or any substantial change in rate of flow at the various outlet openings and without requiring attention from the grower.

The drip irrigation hose typically comprises two or three parallel tubes with openings therebetween for fluid flow from the source through the tubes in series to the ground, with flow being controlled by the sizes of the tubes, the sizes of the flow passages between the tubes and of the outlet passages, and flow restrictions, if any, in the tubes. Typical drip irrigation hoses are shown in U.S. patents to Sahagun-Barragan No. 3,870,236; Boyle No. 3,467,142; Delmer No. 4,196,853; and Delmer No. 4,235,380; and the art of record in those patents.

In addition to the desirable characteristics of continuous and uniform controlled flow in drip irrigation hoses, initial cost is also a factor. Hose typically is made by extrusion or by sealing one or more strips together to produce the desired configuration. The U.S. patent to Allport No. 4,247,051 shows hose made from a single strip of plastic with longitudinal ribs added to provide the spacing for the primary and secondary tubes.

The U.S. patent to Tiedt No. 4,009,832 shows two different constructions. In one embodiment, a plurality of strips are bonded together without any provision for spacing between the strips. In another embodiment, a strip is extruded with spacers and connectors.

In U.S. patent to Leal-Diaz No. 4,047,995, a strip is folded on itself to provide the primary tube, with a portion of the strip being corrugated to provide a plurality of secondary tubes.

It is an object of the present invention to provide a new and improved drip irrigation hose which is made from a single strip of material without requiring any extrusions and without requiring any additional dividers or spacer strips or ribs and without requiring any corrugating of a portion of the strip to provide a secondary tube.

It is another object of the invention to provide such a drip irrigation hose which is suitable for high speed continuous production. A particular object is to provide such hose which can be produced with slits and flaps rather than requiring punching of holes and formation of compression type seals to achieve the desired flow characteristics.

Other objects, advantages, features and results will more fully appear in the course of the following description.

SUMMARY OF THE INVENTION

A multichamber drip irrigation hose for distributing water and the like and formed of a strip of flexible water impermeable material. A larger primary tube and a smaller secondary tube joined at a common wall with first passages in the common wall and second passages in the secondary tube, providing for controlled fluid flow from the primary tube through the secondary tube to the exterior. One or both edges of the strip of material is folded on itself to form a thicker edge. When two thicker edges are used, the strip is folded on itself with each thicker edge bonded to the strip at a location remote from the other thicker edge, thereby providing the primary and secondary tubes. When a single thicker edge is used, the strip is folded on itself and bonded to the thicker edge and to itself at a line spaced from the thicker edge. The common wall may be slit periodically to produce flaps which are folded up to engage the opposite wall of the secondary tube for controlling fluid flow through the secondary tube. The secondary tube exterior wall may be slit periodically to produce flaps which project outward to provide drip points when the hose is suspended above the ground.

DESCRIPTION OF THE PREFERRED EMBODIMENTS

Figure 1:
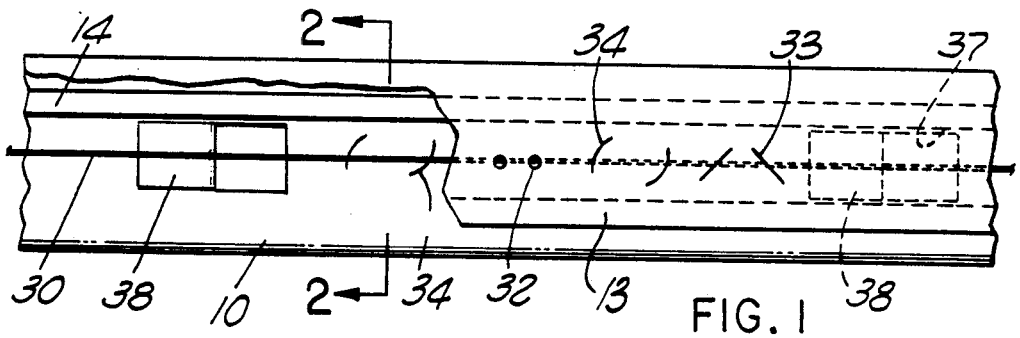
FIG. 1 is a side view of a length of drip irrigation hose incorporating the presently preferred embodiment of the invention.
Figure 2:
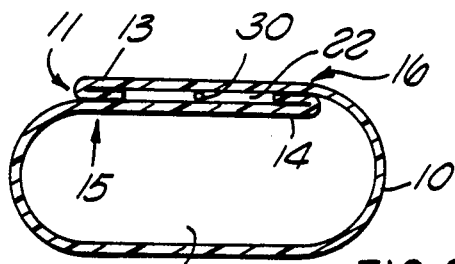
FIG. 2 is an enlarged sectional view taken along the line 2—2 of FIG. 1.

The hose of FIGS. 1 and 2 is formed from a strip of flexible water impermeable material, typically a strip of plastic. The strip 10 has opposite parallel edges indicated at 11, 12 on FIG. 2. In the embodiment of FIGS. 1 and 2, the edge 11 is folded over on itself to produce a thicker edge 13, and the edge 12 is similarly folded over on itself to produce a thicker edge 14. Each folded over edge preferably is bonded to itself, as by an adhesive or heat sealing or otherwise as desired. In the embodiments illustrated in FIGS. 2-6, an adhesive is utilized for the bonding and is indicated by a thicker line between adjacent layers of the material of the strip 10.

The strip with the thicker opposite edges is then folded to the configuration of FIG. 2, with the thicker edge 13 bonded to the strip at 15 and with the thicker edge 14 bonded to the strip at 16, to produce the larger primary tube 21 and the smaller secondary tube 22. With this configuration, the thicker edges provide a space between the two layers of the strip which form the secondary tube 22.

Figure 3:
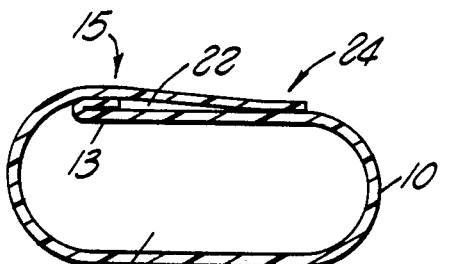
FIGS. 3, 4, 5 and 6 are views similar to that of FIG. 2 showing alternative embodiments of the invention.

Alternative configurations are shown in FIGS. 3-6. In the embodiment of FIG. 3, one thicker edge 13 is utilized, with the strip bonded to the thicker edge at 15 and bonded to itself at 24.

Figure 4:
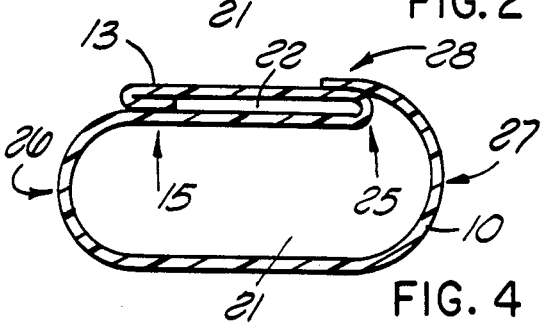

In the embodiment of FIG. 4, the thicker edge 13 is utilized with a first fold 25 and the bond at 15 to produce the secondary chamber 22 and with second and third folds at 26, 27 and a bond at 28 to produce the primary chamber 21.

Figure 5:
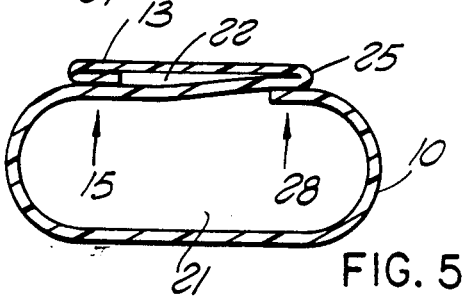

Variations on the embodiment of FIG. 4 are shown in FIG. 5, with the strip bonded to itself at the fold 25.

Also, the bond at 28 is on the inner side, rather than on the outer side as in FIG. 4.

Figure 6:
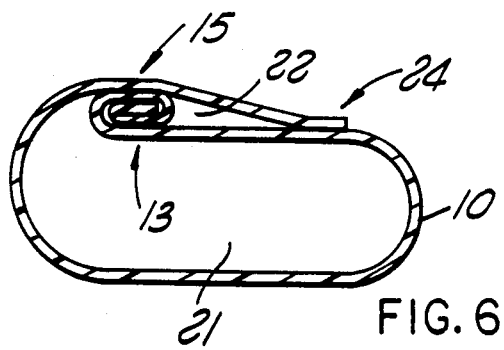

In the embodiment of FIG. 6, the thicker edge 13 is produced by a plurality of folds of the edge 11 to produce a larger secondary tube. In the embodiment illustrated, three folds are utilized, but of course two folds or more than three folds can be used if desired.

Passages are provided in the common wall between the primary and secondary tubes for fluid flow from the primary tube to the secondary tube. Also, passages are provided in an outer wall of the secondary tube for fluid flow from the secondary tube to the exterior. The rate of flow through the hose is controlled by the cross-section areas of the primary and secondary tubes and by the sizes and number of passages utilized. Also, flow restrictions may be introduced into the tubes if desired. In the embodiment illustrated in FIGS. 1 and 2, a flexible monofilament line 30 is positioned in the secondary tube for the purpose of reducing or eliminating clogging due to presence of the silt and the like in the irrigation water. The function of this line is more fully described in the aforementioned Delmer patents Nos. 4,196,853 and 4,235,380.

The passages may take various forms, and several are illustrated, including holes 32, straight slits 33, and arcuate slits 34. Slits are preferred over holes because slits are easier to produce in high speed operations. Arcuate slits are preferred over straight slits because the arcuate slit produces a flap which can raise to permit an obstructing particle to pass through, thereby reducing the likelihood of clogging.

Figure 7:
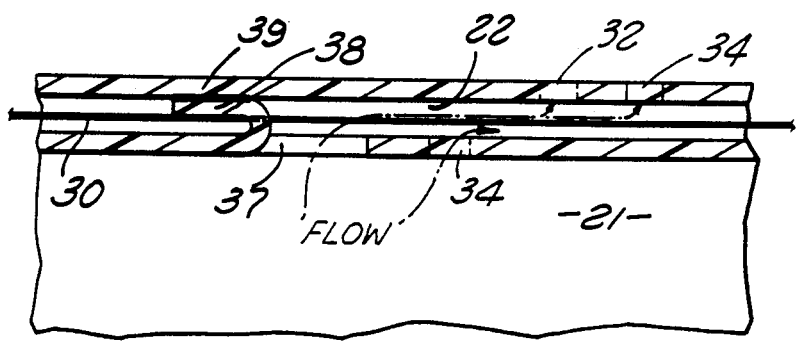
FIG. 7 is an enlarged axial sectional view of the hose of FIG. 1.

In some configurations it is desirable to separate the secondary tube into a plurality of chambers, either completely isolating the chambers one from another or merely restricting flow from one chamber to another. This may be accomplished by utilizing a presser roller to periodically deform the secondary tube to produce a restriction in the tube or to actually periodically close the secondary tube. However it is preferred to utilize a slitted flap as shown in FIGS. 1 and 7. A slit 37, typically U-shaped, is produced in the common wall between the primary and secondary tubes, providing a flap 38 which is folded up to engage the wall 39 of the secondary tube 22. The flap may be bonded to the wall to provide substantially complete isolation between chambers in the secondary tube, or may merely rest against the wall with the possibility of reduced flow past the flap. When the line 30 is utilized, a slit may be provided in the end of the flap for receiving the line.

The hose may be produced in a continuous operation by moving the strip 10 past a plurality of work stations in succession. The various passages, either slits, openings or both, are made in the flat strip and the strip may be scored or partially slit as desired to make subsequent folding easier. In forming a thicker edge, an adhesive is applied at the desired location, the edge is folded or rolled over onto the adhesive, and the material is pressed together to complete the bond. Opposed thicker edges may be produced at the same time. The completed hose may be made in the same manner, by appropriately applying adhesive, folding over the strip, and applying pressure. If the strip is maintained taut during the manufacturing process, the tension in the strip can provide the necessary pressure for completing folds and bonds and separate presser rolls may be omitted. The flaps 38 may be blown or mechanically pushed to the folded position, and a swipe of adhesive applied just prior to folding over of the strip, with the tension in the strip providing pressure for completing the bond. It is preferred in forming the slits such as 33 and 34, that the slits be transverse or at an angle as shown in FIG. 1, rather than axial. With this configuration, the slits span the width of the secondary tube to assure the existence of passages even though there is misapplication of the adhesive or lateral shifting of the strip during the manufacturing process.

In a typical hose, the strip 10 may be polyethylene in the order of 0.010 inches thick and 3 inches wide. The folded over edge is in the order of one-eighth inch wide and the secondary tube is about one-eighth inch by 0.010 inches. The spacing of the passages will be dependent upon the pressure available, the length of hose to be used, the quality of water available, and the amount of irrigation desired.

Figure 8:
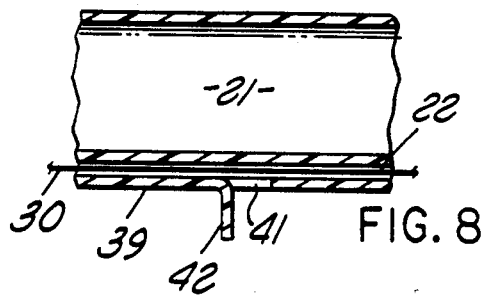
FIG. 8 is a sectional view similar to that of FIG. 7 illustrating the use of the drip irrigation hose in a suspended condition.

Another alternative embodiment especially suited for suspension of the hose above the ground, is shown in FIG. 8. Slots 41, typically U-shaped, are produced in the exterior wall 39 of the secondary tube 22, providing flaps 42 which project outward from the wall 39 when the hose is filled. With the hose suspended above the ground, water tends to run along the lower side of the hose and drip at random from varying points and to concentrate at lower portions of the hose. The flaps 42 provide drip points at spaced locations controlled by the spacing of the flaps so that the water is distributed more uniformly over the ground.

We claim:

1. A multichamber drip irrigation hose for distributing water and the like, comprising
    a larger primary tube and a smaller secondary tube of flexible water impermeable material and joined at a common wall,
    said common wall having a series of first passages facing the interior of said primary tube in communication with the interior of said secondary tube,
    said secondary tube having a series of second passages leading from the interior of said secondary tube to the exterior,
    with said tubes comprising a single strip of said material as the the sole structure of said tubes, said strip having opposite edges with at least one of said edges folded on itself with a 180° bend to form a thicker edge, and
    with said strip folded and bonded to said thicker edge and to itself along a line spaced from said thicker edge to form said primary and secondary tubes with said thicker edge comprising the structure spacing said strip from itself.

2. An irrigation hose as defined in claim 1 having each of said opposite edges folded on itself to form opposed thicker edges, and having said strip bonded to each of said thicker edges.

3. An irrigation hose as defined in claim 1 having said primary tube formed with first and second folds of said strip.

4. An irrigation hose as defined in claim 1 having said secondary tube formed with a first fold of said strip and having said primary tube formed with second and third folds of said strip.

5. An irrigation hose as defined in claim 4 with said strip bonded to itself at said first fold.

6. An irrigation hose as defined in claim 1 having said one edge folded on itself a plurality of times.

7. An irrigation hose as defined in claim 1 including a flexible filamentary line positioned within said secondary tube.

8. An irrigation hose as defined in claim 1 wherein said first passages include a flap formed by slitting said common wall, with said flap raised from said common wall to contact said secondary tube opposite said common wall for controlling fluid flow through said secondary tube.

9. An irrigation hose as defined in claim 8 with said raised flap bonded to said secondary tube opposite said common wall.

10. An irrigation hose as defined in claim 8 with said flap having a slit therein, and including a flexible filamentary line positioned within said secondary tube and in said flap slit.

11. An irrigation hose as defined in claim 1 wherein said first passages include holes.

12. An irrigation hose as defined in claim 1 wherein said first passages include slits.

13. An irrigation hose as defined in claim 1 wherein said second passages include holes.

14. An irrigation hose as defined in claim 1 wherein said second passages include slits.

15. An irrigation hose as defined in claim 1 wherein said first passages include spaced arcuate slits in said common wall.

16. An irrigation hose as defined in claim 15 with said adjacent arcuate slits having opposite curvature.

17. An irrigation hose as defined in claim 1 wherein said second passages include spaced arcuate slits in said second tube opposite said common wall.

18. An irrigation hose as defined in claim 17 with said adjacent arcuate slits having opposite curvature.

19. An irrigation hose as defined in claim 1 wherein said second passages include a flap formed by slitting the exterior wall of said secondary tube.

20. An irrigation hose as defined in claim 8 wherein said second passages include a secondary flap formed by slitting the exterior wall of said secondary tube.

21. A multichamber drip irrigation hose for distributing water and the like, comprising
  a larger primary tube and a smaller secondary tube of flexible water impermeable material and joined at a common wall,
  said common wall having a series of first passages facing the interior of said primary tube in communication with the interior of said secondary tube,
  said secondary tube having a series of second passages leading from the interior of said secondary tube to the exterior,
  with said tubes comprising a single strip of said material as the sole structure of said tubes, said strip having first and second opposite edges with said first edge folded on itself with a 180° bend to form a thicker first edge,
  with said strip folded and bonded to said thicker first edge along a line spaced from said second edge and bonded to itself at said second edge along a line spaced from said thicker first edge to form said primary and secondary tubes with said thicker first edge comprising the structure spacing said strip from itself, and
  flap means in said secondary tube dividing said secondary tube into a plurality of discrete chambers, each chamber having at least one first passage and one second passage, said flap means comprising a flap formed by slitting said common wall, with said flap raised from said common wall to contact said secondary tube opposite said common wall and define said discrete chambers.

* * * * *